United States Patent
Matsunaga

(10) Patent No.: US 9,659,239 B2
(45) Date of Patent: May 23, 2017

(54) MACHINE LEARNING DEVICE AND CLASSIFICATION DEVICE FOR ACCURATELY CLASSIFYING INTO CATEGORY TO WHICH CONTENT BELONGS

(71) Applicant: CASIO COMPUTER CO., LTD., Shibuya-ku, Tokyo (JP)

(72) Inventor: Kazuhisa Matsunaga, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 26 days.

(21) Appl. No.: 14/850,516

(22) Filed: Sep. 10, 2015

(65) Prior Publication Data
US 2016/0125273 A1 May 5, 2016

(30) Foreign Application Priority Data
Oct. 31, 2014 (JP) ................................. 2014-222600

(51) Int. Cl.
*G06K 9/62* (2006.01)
*G06K 9/46* (2006.01)

(52) U.S. Cl.
CPC ......... *G06K 9/6269* (2013.01); *G06K 9/6234* (2013.01); *G06K 9/4676* (2013.01)

(58) Field of Classification Search
CPC ... G06K 9/6269; G06K 9/6234; G06K 9/4676
See application file for complete search history.

(56) References Cited

U.S. PATENT DOCUMENTS

| | | | | |
|---|---|---|---|---|
| 7,840,060 B2 * | 11/2010 | Podilchuk | ............ | G06K 9/6215 382/155 |
| 8,478,052 B1 * | 7/2013 | Yee | ...................... | G06K 9/4676 382/155 |
| 9,436,893 B2 * | 9/2016 | Yang | ..................... | G06K 9/6235 |
| 2003/0021481 A1 * | 1/2003 | Kasutani | ........... | G06F 17/30271 382/218 |
| 2009/0097756 A1 * | 4/2009 | Kato | ................. | G06F 17/30256 382/190 |

(Continued)

OTHER PUBLICATIONS

Sabri Boughorbel, et al., "Generalized Histogram Intersection Kernel for Image Recognition", International Conference on Image Processing (ICIP), Sep. 11-14, 2005, 4 Pages.

*Primary Examiner* — John Strege
(74) *Attorney, Agent, or Firm* — Holtz, Holtz & Volek PC

(57) ABSTRACT

An image acquisition unit of a machine learning device acquires n learning images assigned with labels to be used for categorization (n is a natural number larger than or equal to 2). A feature vector acquisition unit acquires a feature vector representing a feature from each of the n learning images. A vector conversion unit converts the feature vector for each of the n learning images to a similarity feature vector based on a similarity degree between the learning images. A classification condition learning unit learns a classification condition for categorizing the n learning images, based on the similarity feature vector converted by the vector conversion unit and the label assigned to each of the n learning images. A classification unit categorizes unlabeled testing images in accordance with the classification condition learned by the classification condition learning unit.

14 Claims, 15 Drawing Sheets

(56) References Cited

U.S. PATENT DOCUMENTS

| | | | |
|---|---|---|---|
| 2009/0150309 A1* | 6/2009 | Chapelle | G06K 9/6269 |
| | | | 706/12 |
| 2011/0158536 A1* | 6/2011 | Nakano | G06K 9/00281 |
| | | | 382/190 |
| 2013/0111005 A1* | 5/2013 | Chu | G06N 7/005 |
| | | | 709/224 |
| 2013/0325759 A1* | 12/2013 | Rachevsky | G06N 99/005 |
| | | | 706/12 |
| 2015/0332172 A1* | 11/2015 | Konoshima | G06F 17/16 |
| | | | 706/12 |

* cited by examiner

FIG. 6

SIMILARITY FEATURE VECTOR OF
LEANING IMAGE $S_1$

| | | | | | |
|---|---|---|---|---|---|
| $\alpha=1$ | 1.0 | 0.4 | 0.5 | ... | 0.5 |
| $\alpha=2$ | 1.0 | 0.16 | 0.25 | ... | 0.25 |
| $\alpha=0.5$ | 1.0 | 0.63 | 0.71 | ... | 0.71 |

WHEN C IS LARGE
(HARD MARGIN)

WHEN C IS SMALL
(SOFT MARGIN)

FIG. 10

TABLE FOR TRUE OR
FALSE DETERMINATION

| TESTING IMAGE | LABEL |
|---|---|
| $T_1$ | 1 |
| $T_2$ | −1 |
| ⋮ | ⋮ |
| $T_m$ | 1 |

…

MACHINE LEARNING DEVICE AND CLASSIFICATION DEVICE FOR ACCURATELY CLASSIFYING INTO CATEGORY TO WHICH CONTENT BELONGS

CROSS-REFERENCE TO RELATED APPLICATION

This application claims the benefit of Japanese Patent Application No. 2014-222600, filed on Oct. 31, 2014, the entire disclosure of which is incorporated by reference herein.

FIELD

The present disclosure relates to a machine learning device and a classification device for accurately classifying into a category to which a content belongs.

BACKGROUND

A classification device is conventionally known in the art that classifies a content (e.g., an image, a sound, a text, or the like) into a category to which the content belongs. The classification device classifies a content in accordance with a classification condition for classifying the content. The classification condition is generally one that is machine-learned by a machine learning device.

Support Vector Machine (SVM) is known in the art as a machine learning device that learns a classification condition for classifying a content into two categories.

The SVM (machine learning device) uses a set of learning contents that belong to one of two categories and a set of learning contents that belong to the other of the two categories in order to learn beforehand a classification condition (e.g., a function for the classification) for classifying these sets into the two categories. Meanwhile, the classification device classifies an unknown content into either one of the two categories in accordance with the learned classification condition. An SVM technique to separate non-linearly two sets that cannot be separated linearly is disclosed in "GENERALIZED HISTOGRAM INTERSECTION KERNEL FOR IMAGE RECOGNITION", International Conference on Image Processing (ICIP), September 2005.

SUMMARY

The machine learning device according to a first aspect of the present disclosure includes:

a content acquirer that acquires n learning contents (n is a natural number larger than or equal to 2) with a label to be used for categorization;

a feature vector acquirer that acquires a feature vector from each of the n learning contents acquired by the content acquirer;

a vector converter that converts the feature vectors for the n learning contents acquired by the feature vector acquirer to similarity feature vectors based on similarity degrees between the learning contents;

a condition learning device that learns a classification condition for categorizing the n learning contents based on the similarity feature vectors converted by the vector converter and a label assigned to each of the n learning contents; and a classifier that categorizes a testing content to which the label is not assigned, in accordance with the classification condition learned by the condition learning device.

The classification device according to a second aspect of the present disclosure includes:

an unknown-content classifier that categorizes an unknown content different from the learning contents and the testing contents in accordance with a classification condition learned by the machine learning device according to the first aspect of the present disclosure.

BRIEF DESCRIPTION OF THE DRAWINGS

A more complete understanding of this application can be obtained when the following detailed description is considered in conjunction with the following drawings, in which:

FIG. 6 is a view illustrating an example of similarity feature vector after exponentiation by an exponentiation parameter $\alpha$;

FIG. 10 is a view illustrating an example of the table for true or false determination;

DETAILED DESCRIPTION

Embodiments of the present disclosure will now be described based on the drawings.

Figure 1:
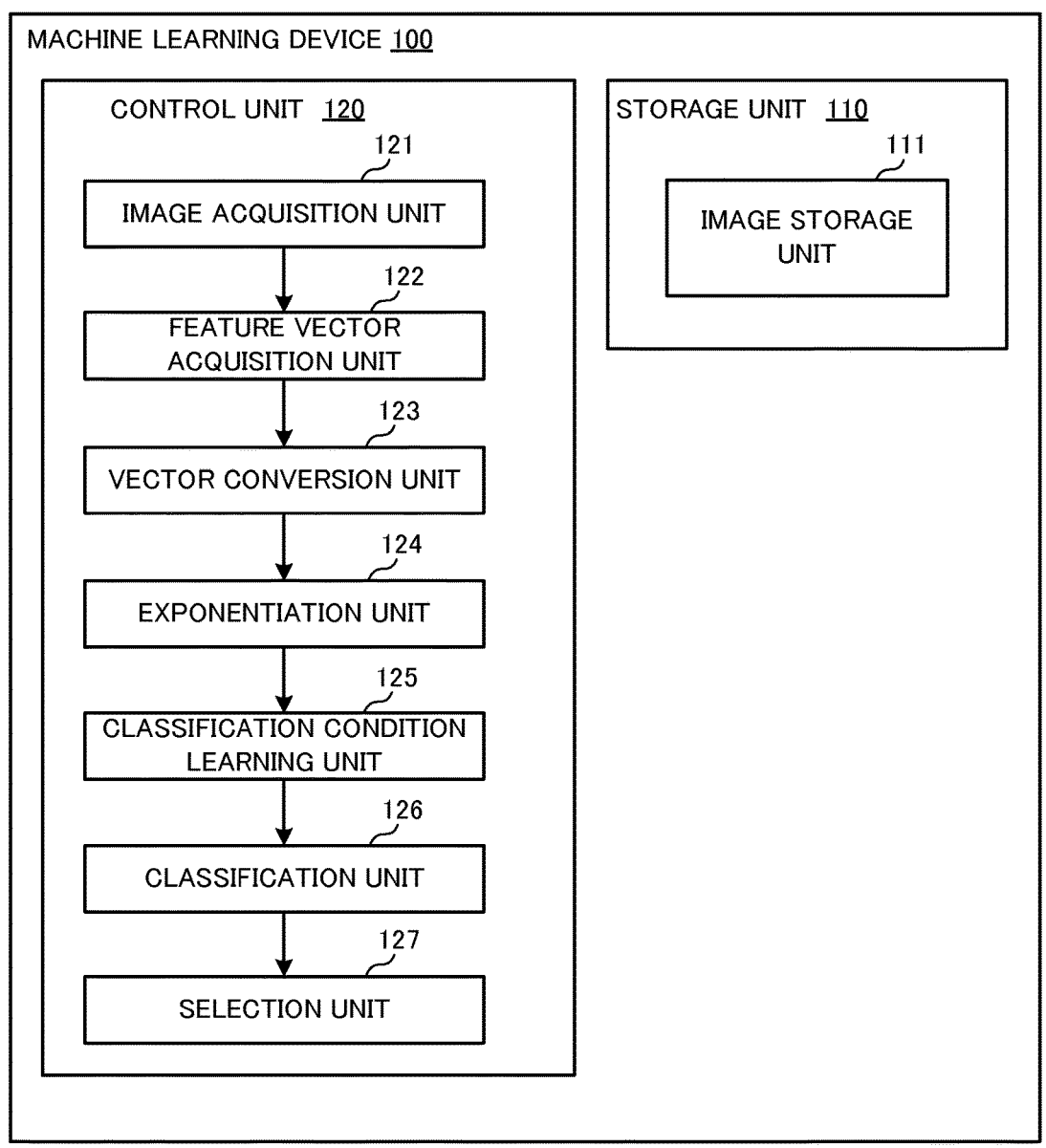
FIG. 1 is a block diagram illustrating the configuration of a machine learning device.

As illustrated in FIG. 1, the machine learning device 100 includes a storage unit 110 and a control unit 120. The machine learning device 100 is a device for machine learning of a classification condition for classifying a learning content (an image, a sound, a text, or the like) into two categories. The machine learning device 100 goes through a learning stage for learning the classification condition from the learning content, and a testing stage for making a true or false evaluation by classifying a testing content in accordance with the learned classification condition. Thereafter, a classification device classifies an unknown content, which is different from the learning content and the testing content, in accordance with the learned classification condition in a commercial environment.

In the present embodiment, a description is made with a focus on the learning stage and the testing stage of the machine learning device 100. Meanwhile, in the present embodiment, an image is taken as an example of content for description. Further, in the present embodiment, "leaning a classification condition" and "generating a classification condition" are the same in meaning, and the following description will be made in terms of either one of them arbitrarily.

Figure 2:
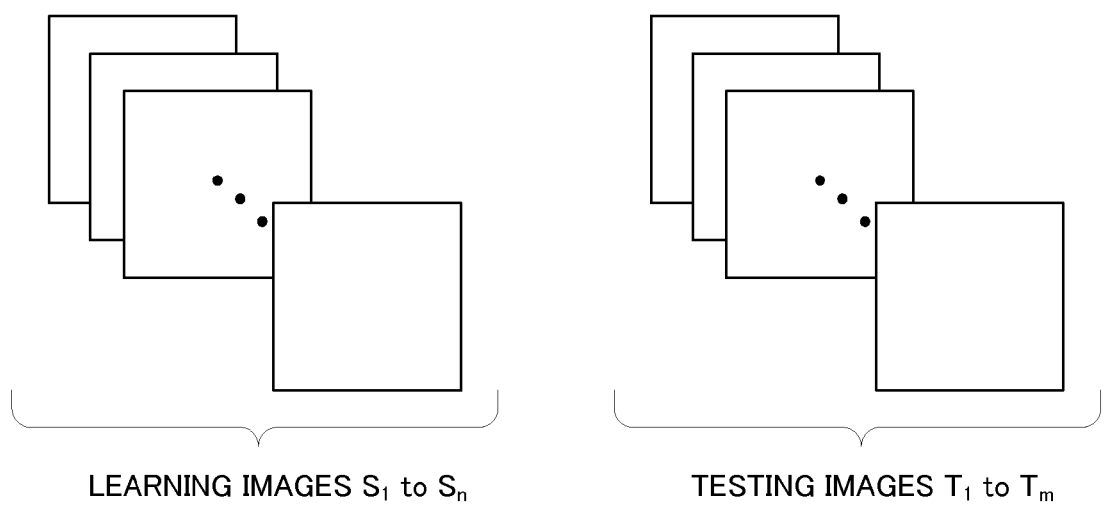
FIG. 2 is a view illustrating an example of learning images and testing images.

A storage unit 110 is a nonvolatile memory such as HDD (Hard Disk Drive). The storage unit 110 includes an image storage unit 111. The image storage unit 111 stores learning images $S_1$ to $S_n$ and testing images $T_1$ to $T_m$ such as illustrated in FIG. 2. The learning images $S_1$ to $S_n$ are labeled images which are assigned with a label for classifying the learning images $S_1$ to $S_n$ into two categories. The label assumes one value (e.g., 1) or other value (e.g., −1) for the two categories. Meanwhile, the testing images $T_1$-$T_m$ are unlabeled images which are not assigned with labels.

Further, it is required that the number (n) of the labeled learning images be two or greater, in other words, that the n be a natural number that is two or greater from the standpoint of the classification into two categories. Further, it is required that the number (m) of the unlabeled testing images be two or greater, in other words, that the m be a natural number that is two or greater in order to make a true or false evaluation a plurality of times, in other words, that the m be a natural number that is two or greater. In the present embodiment, in order to facilitate understanding, the description is made on the assumption that n and m are equal to each other, i.e., n=m.

Regarding the learning images $S_1$ to $S_n$, when there is no particular necessity to specify any one of the learning images (e.g., the learning image $S_1$ or the like), description is made merely referring to them as learning images. Further, regarding the learning images $S_1$ to $S_n$, when two or more labeled learning images are referred to collectively, description is made referring to them as a plurality of learning images or n learning images appropriately. The above applies to the testing images $T_1$ to $T_m$ as well.

Description will now be made of the flow until a plurality of learning images and a plurality of testing images are stored in the image storage unit 111. The user may collect beforehand the plurality of learning images and the plurality of testing images depending on purpose. For example, when the user wants to classify the images into two categories depending on whether the images include a particular subject, the user may collect beforehand one hundred person images including the subject and one hundred landscape images not including the subject. Then, fifty of the one hundred person images are made to be learning images with the label 1, and the remaining fifty are made to be testing images with no label. Meanwhile, fifty of the one hundred landscape images are made to be learning images with the label −1, and the remaining fifty are made to be testing images.

In this manner, by way of example, there are obtained one hundred leaning images with the label 1 or −1, and one hundred testing images with no label. Then, the total two hundred images as collected are stored in the image storage unit 111 of the machine learning device 100. Consequently, the preparation for learning is ready, and it becomes a state in which machine-learning by the machine learning device 100 is possible.

Meanwhile, the machine learning device 100 executes true or false determination of whether the testing images classified under the classification condition at the testing stage are classified into a correct category. Thus, the testing images are associated with the label (1 or −1) for the purpose of true or false determination and then stored in the storage unit 110. In other words, the testing images are the same as unknown images for which a true or false determination cannot be made such as images classified by a classification device after being released in a commercial environment, except that a true or false determination can be made subsequent to classification (i.e. that a table for true or false determination is stored in the storage unit 110). Specific processing at the testing stage will be described hereinafter.

Returning to FIG. 1, the control unit 120 is configured of CPU (Central Processing Unit), ROM (Read Only Memory), RAM (Random Access Memory) or the like. The CPU of the control unit 120 reads out and executes a classification processing program stored in the ROM to achieve respective functions (an image acquisition unit 121, a feature vector acquisition unit 122, a vector conversion unit 123, an exponentiation unit 124, a classification condition learning unit 125, a classification unit 126, and a selection unit 127).

The image acquisition unit 121 acquires a plurality of learning images and a plurality of testing images. Specifically, the image acquisition unit 121 acquires n learning images (n≥2) and m testing images (m≥2) from the image storage unit 111. Meanwhile, the image acquisition unit 121 may of course acquire the both images not only from the image storage unit 111 but from outside wiredly or wirelessly. The image acquisition unit 121 corresponds to the content acquirer.

The feature vector acquisition unit 122 acquires a feature vector representing a feature from each of the plurality of learning images and the plurality of testing images acquired by the image acquisition unit 121. Specifically, first, the feature vector acquisition unit 122 acquires feature vectors in which local features are quantified via the BoF (Bag of Features), for example, from each of the n learning images. Then, the feature vector acquisition unit 122 normalizes, via the L1-norm, the feature vectors acquired from each of the n learning images.

The L1 norm is an absolute value sum of the respective components of the feature vector. By dividing each component of the feature vector by the L1 norm, the value of each component is normalized to 0 to 1. In this manner, the non-uniform values of the respective components can be made to be of the same scale, thereby facilitating arithmetic processing when the similarity described below is calculated. The feature vector may be normalized not only via the L1 norm but also via the L2 norm that is a square-root of a sum of squares of the respective components of the feature vector.

Figure 3:
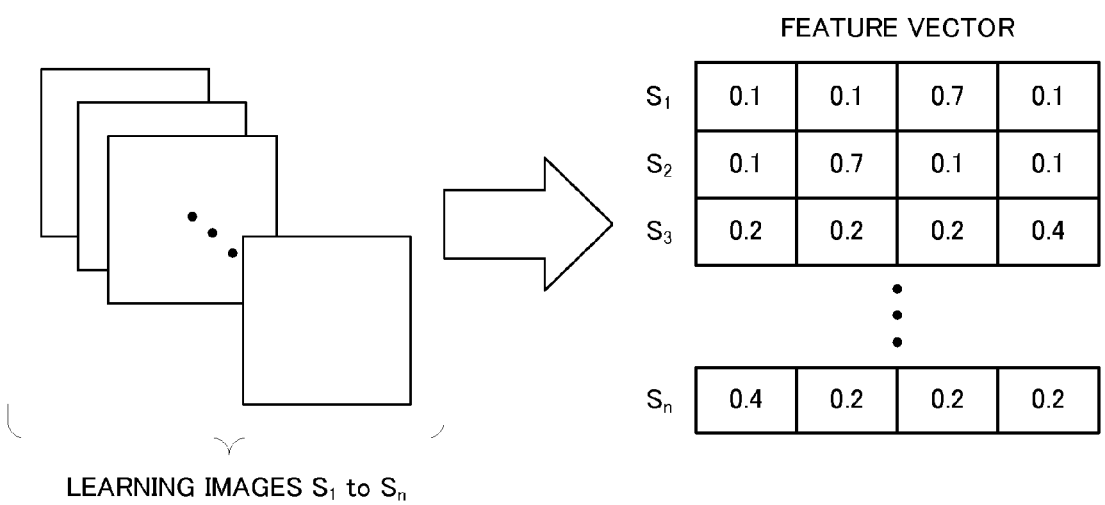
FIG. 3 is a view illustrating an example of feature vectors acquired from the learning images.

Referring now to FIG. 3, it is described to acquire the feature vector from each of the labeled learning images $S_1$ to $S_n$. In FIG. 3, the normalized feature vector acquired from the first learning image $S_1$ is represented by (0.1, 0.1, 0.7, 0.1), and the normalized feature vector acquired from the nth learning image $S_n$ is represented by (0.4, 0.2, 0.2, 0.2), for example. From this feature vector, it can be seen that the feature vector acquisition unit 122 has quantified local four features and acquired four components of the feature vector. Thus, since the number of the components of the feature vector is four (4), the number of dimensions is four (4), so that the feature vector is four (4)-dimensional.

The feature vector acquisition unit 122 acquires feature vectors from each of the m testing images in a similar manner. The feature vector acquisition unit 122 corresponds to the feature vector acquirer.

Returning to FIG. 1, the vector conversion unit 123 converts the feature vector of each of the n learning images acquired by the feature vector acquisition unit 122 to a similarity feature vector based on the similarity degree between the learning images.

Figure 4:
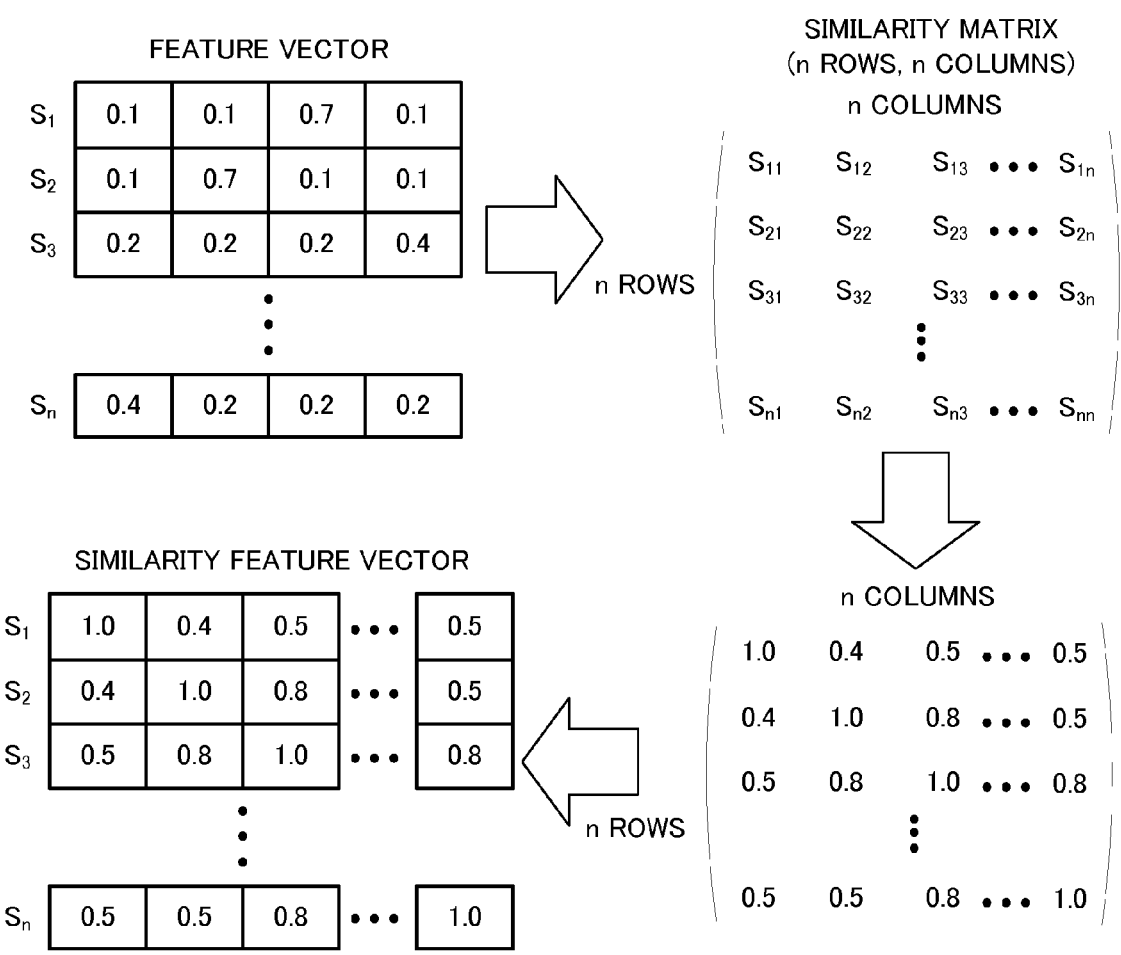
FIG. 4 is a view illustrating an example of the flow for converting the feature vectors for the learning images to similarity feature vectors.

Specifically, first, the vector conversion unit 123 generates a similarity matrix including n rows and n columns in which the number of rows is n equal to the number n, the number of columns is n equal to the number n, and each component is the similarity degree between the contents (refer to FIG. 4). Then, the vector conversion unit 123 makes each row vector of each row of the resultant similarity matrix to be a similarity feature vector that is to be substituted for the feature vector of each of the n learning images.

Taking the feature vector (0.1, 0.1, 0.7, 0.1) of the learning image $S_1$ in FIG. 4 as an example for description, the row vector for the first row corresponding to this feature vector is $(S_{11}, S_{12}, S_{13}, \ldots S_{1n})$. Each component of the row vector is the similarity degree between the learning images, and $S_{11}$ represents the similarity degree between the learning images $S_1$, $S_{12}$ the similarity degree between the learning images $S_1$ and $S_2$, $S_{13}$ the similarity degree between the learning images $S_1$ and $S_3$, and $S_{1n}$ the similarity degree between the learning images $S_1$ and $S_n$, respectively. The similarity degree is calculated from a histogram intersection represented by the following equation (1):

$$k(x,y)=\Sigma_{i=1}^{n}\min(x_i,y_i) \quad (1)$$

In the above equation (1), n represents the number of dimensions, $x_i$ the value of the i-dimensional component in the feature vector of one image which is a comparison object, $y_i$ the value of the i-dimensional component in the feature vector of the other image which is a comparison object, and k(x, y) the similarity degree, respectively. The above equation (1) indicates that a smaller one of the component values of the two images in the same dimension (i.e. in the same local feature portion) is selected, and that the sum of the smaller values selected in each of all dimensions is made to be the similarity degree (value of 1 to 0). The closer to 1 the similarity degree is, the more the two images resemble each other. When the component values of the two images are equal, either one of them may be selected.

In the case of FIG. 4, for example, since the component values are equal in all dimensions, the similarity degree for S11 becomes such that 0.1+0.1+0.7+0.1=1.0. Meanwhile, selecting and summing 0.1 of the one-dimensional values 0.1 and 0.1, 0.1 of the two-dimensional values 0.1 and 0.7, 0.1 of the three-dimensional values 0.7 and 0.1, and 0.1 of the four-dimensional values 0.1 and 0.1, the similarity degree for S12 becomes such that 0.1+0.1+0.1+0.1=0.4.

In such a manner, the similarity degree of each component of the similarity matrix is sought from the histogram intersection using the equation 1 (refer to FIG. 4). Further, each of the row vectors for the respective rows of the similarity matrix is made to be the similarity feature vector to be substituted for the feature vector for each of the n learning images. For example, the similarity feature vector to be substituted for the feature vector (0.1, 0.1, 0.7, 0.1) for the learning image $S_1$ is (1.0, 0.4, 0.5, . . . 0.5).

Thus, because of the fact that the vector conversion unit 123 generates the similarity matrix, it is possible to convert the n feature vectors into n similarity feature vectors. Each component of the similarity feature vector is the similarity degree between the respective learning images. Consequently, it is possible to displace the position of a point determined from the feature vector to the position of a point determined from the similarity feature vector in a vector space. This means that the manner of distribution of n points in the vector space varies.

Further, since the value of each component of the similarity feature vector is the similarity degree, it may well be said that a non-linear conversion has been performed. The non-linear conversion refers to a process (e.g., a process for multiplying a predetermined value by a factor) other than an arithmetic process for performing a linear conversion (e.g., a process for exponentiating a predetermined value, a process for substituting for the similarity degree, or the like). Thus, in a vector space, the position of a point determined from a feature vector is moved to the position of a point determined from the similarity feature vector; in other words, a linear motion is not created.

Meanwhile, when the number (n) of the components of the similarity feature vector is larger than the number of the components of the feature vector, the number of dimensions of the feature vector is extended to n dimensions. In the present embodiment, since the feature vector is four (4)-dimensional, the number of dimensions can be extended by converting the feature vector to the similarity feature vector, when n>4. This means that a change has been made from the four (4)-dimensional vector space to the n-dimensional vector space.

Figure 5:
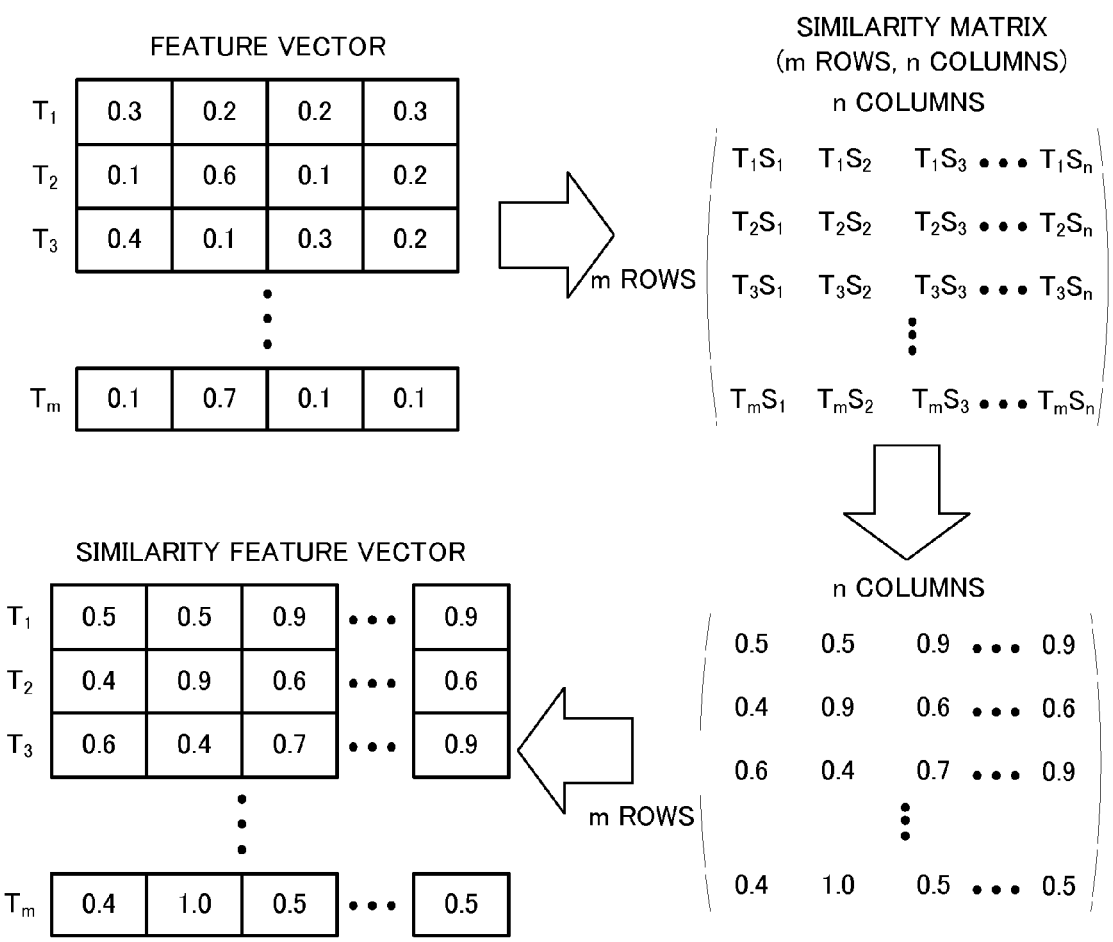
FIG. 5 is a view illustrating an example of the flow for converting the feature vectors for the testing images to similarity feature vectors.

Meanwhile, the vector conversion unit 123 converts, in a similar manner, the feature vectors for each of the m testing images to the similarity feature vectors based on the similarity degree between the learning image and the testing image (refer to FIG. 5). Since the similarity degree of the learning image is calculated with the learning image as reference, the similarity degree is calculated with the learning image as reference in order to match the scale at the time of test.

In this manner, an m(=n)-row and n-column similarity matrix of the testing image is generated, and m feature vectors can be converted to m similarity feature vectors, respectively (see FIG. 5). The vector conversion unit 123 corresponds to the vector converter.

Returning to FIG. 1, the exponentiation unit 124 exponentiates the value of the similarity degree for each component of the similarity feature vector. For example, the exponentiation unit 124 exponentiates the value (1.0, 0.4, 0.5, . . . 0.5) of the similarity degree for each component of the similarity feature vector for the learning image $S_1$ in FIG. 4. In FIG. 6, there is illustrated an example after the exponentiation for the cases where the exponentiation parameter $\alpha$ is set to 1, 2, and 0.5, respectively. In this instance, since the value for each component of the similarity feature vector is raised to the 1st, 2nd, and 0.5th power, it follows that three different patterns of distribution are obtained in the n-dimensional vector space.

Figure 7:
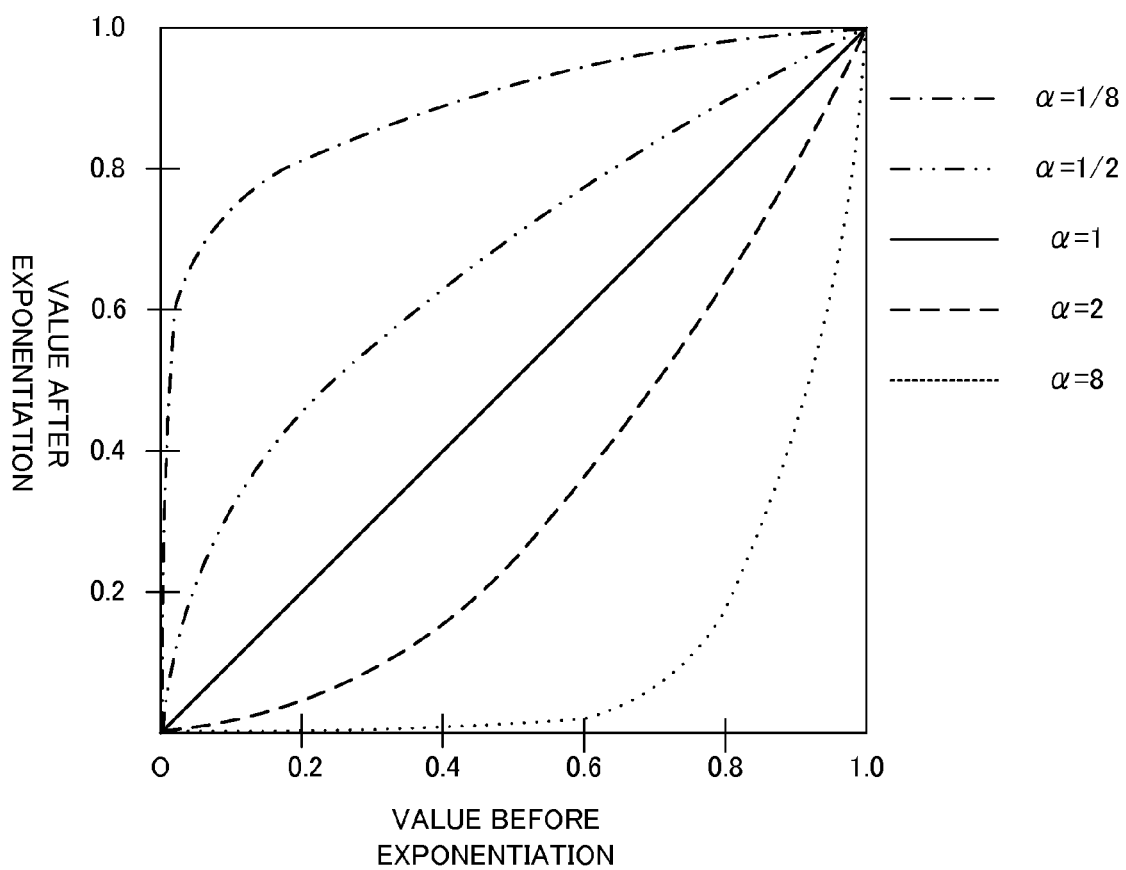
FIG. 7 is a view illustrating variations in the value before and after exponentiation depending on the value of the exponentiation parameter $\alpha$.

This will be described with reference to FIG. 7. FIG. 7 is a view illustrating variations before and after the exponentiation depending on the value for the exponentiation parameter a. From this figure, it is seen that the higher the value for a, the lower the value after the exponentiation becomes with respect to the value before the exponentiation. This means that the value before the exponentiation, for which the similarity degree is low, is regarded as noise and the value for which the similarity degree is close to 1 is left. Meanwhile, the lower the value for a, the higher the value after the exponentiation becomes with respect to the value before the exponentiation for which the similarity degree is low. This means that the value before the exponentiation which the similarity degree is low is not regarded as noise but is increased and left.

As appreciated from the above, the variety of the distribution can be increased by changing the value for the similarity degree depending on the exponentiation parameter α, and thus the degree of freedom is enhanced when the classification into two (2) categories is carried out. Regarding the timing to perform the exponentiation and how to select the value for the exponentiation, it will be described hereinafter. The exponentiation unit 124 corresponds to the exponent generator.

Returning to FIG. 1, the classification condition learning unit 125 learns the classification condition for categorizing the n learning images (generates the classification condition) based on the similarity feature vector converted in the vector conversion unit 123 and the label assigned to each of the n learning images.

Specifically, the classification condition learning unit 125 learns with, as reference, a function (referred to sometimes as discriminant function) to separate into two categories n points in the vector space which are determined from the similarity feature vector for each of the n learning images $S_1$ to $S_n$. In the present embodiment, that the machine learning device 100 learns means that it generates a discriminant function. Further, in the present embodiment, a discriminant function that performs linear separation into two categories is generated by a linear SVM (Support Vector Machine).

Figure 8:
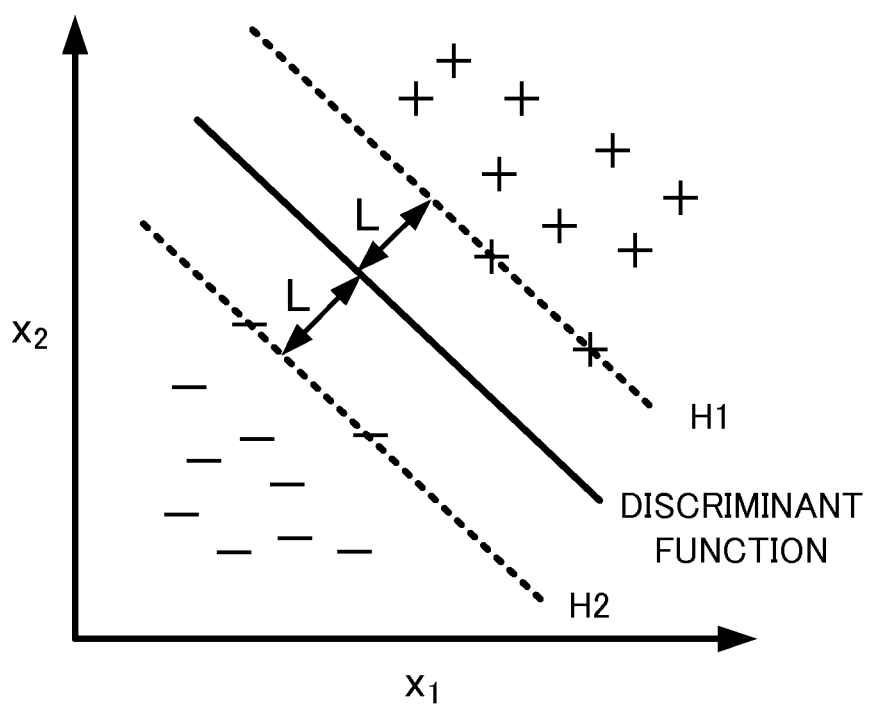
FIG. 8 is a view for explaining the principle of linear SVM (Support Vector Machine)

Apart from the above-described embodiment for now, the principle of the linear SVM will be described with reference to FIG. 8. In FIG. 8, in order to facilitate understanding, a two-dimensional feature vector in which the number of the components, x1 and x2, of the feature vector is two is described by way of example. In FIG. 8, an example is illustrated in which there are distributed, in a two-dimensional space, points (+) determined from the feature vector of each of a plurality of learning images with a label of 1 and points (−) determined from the feature vector of each of a plurality of learning images with a label of −1. This can be represented by the following equation (2):

$$y_j = \begin{cases} 1 (x_j \in C_1) \\ -1 (x_j \in C_2) \end{cases} (j = 1, 2 \ldots n) \quad (2)$$

In the above equation (2), j indicates an arbitrary jth one of the first to nth learning images. The equation (2) shows that the label y for the jth learning image belonging to the category $C_1$ is 1, and the label y for the jth learning image belonging to the category $C_2$ is −1.

Further, the discriminate function of FIG. 8 is represented by the following equation (3):

$$y = wx + b \quad (3)$$

In the above equation (3), w and b represent a weighting vector and a bias term, respectively. In the linear SVM, w and b are sought in a manner to maximize a margin L that is the distance from the discriminant function indicated by a solid line to a nearest point (support vector). The margin L can be sought from the following equation (4) of $H_1$ and $H_2$:

$$\begin{cases} H_1 : wx_{C1} + b = 1 \\ H_2 : wx_{C2} + b = -1 \end{cases} \quad (4)$$

$H_1$ represents the equation for a boundary on which one or more support vectors belonging to $C_1$ (in the example of FIG. 8, two points +) are located. Meanwhile, H2 represents the equation for a boundary on which one or more support vectors belonging to $C_2$ (in the example of FIG. 8, two points −) are located. $x_{c1}$ and $x_{c2}$ represent $x_j$ belonging to the category $C_1$ and $x_j$ belonging to the category $C_2$, respectively. When subtracting the two from each other in order to seek the margin L, it follows that: $w(x_{c1} - x_{c2}) = 2$ When dividing the both sides by $\|w\|$, it follows that: $(x_{c1} - x_{c2}) = 2/\|w\|$ In other words, since it follows that $2L = 2/\|w\|$, the margin L is given by the following equation (5):

$$L = \frac{1_{20}}{\|w\|} \quad (5)$$

In order to maximize the margin L, $\|w\|$ may be minimized. This $\|w\|$ is substituted with the following equivalent equation (6):

$$L(w) = 1/2 \|w\|^2 \quad (6)$$

Further, the following formula (7) can be derived from the equations (2) and (3):

$$\begin{cases} wx_j + b \geq 1 & \text{if } x_j \in C_1 \\ wx_j + b \leq -1 & \text{if } x_j \in C_2 \end{cases} \quad (7)$$

The formula (7) can be simplified like the following formula (8):

$$y_j(wx_j + b) \geq 1 \quad (8)$$

The formula (8) becomes a constraint condition when w and b are sought. By seeking w and b to minimize the equation (6) while satisfying the formula (8), it is possible to generate a discriminant function for which the margin L is maximum. In other words, the generation of a discriminant function for which the margin L is maximum may be referred to as a conditional minimization problem to minimize the equation (6) under the constraint condition of the formula (8).

Figure 9A:
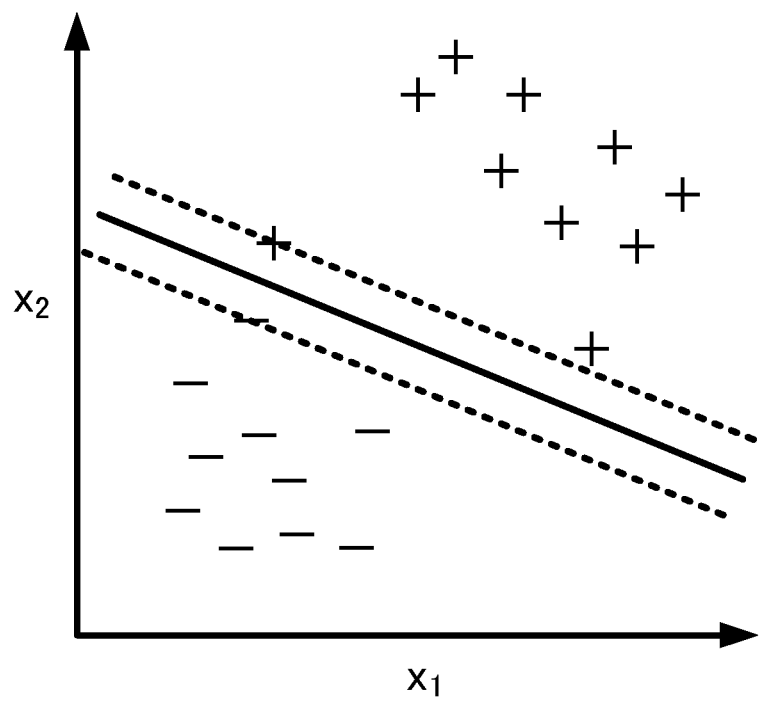
FIG. 9A is a view illustrating an example of the case in which an adjustment parameter C is large.
Figure 9B:
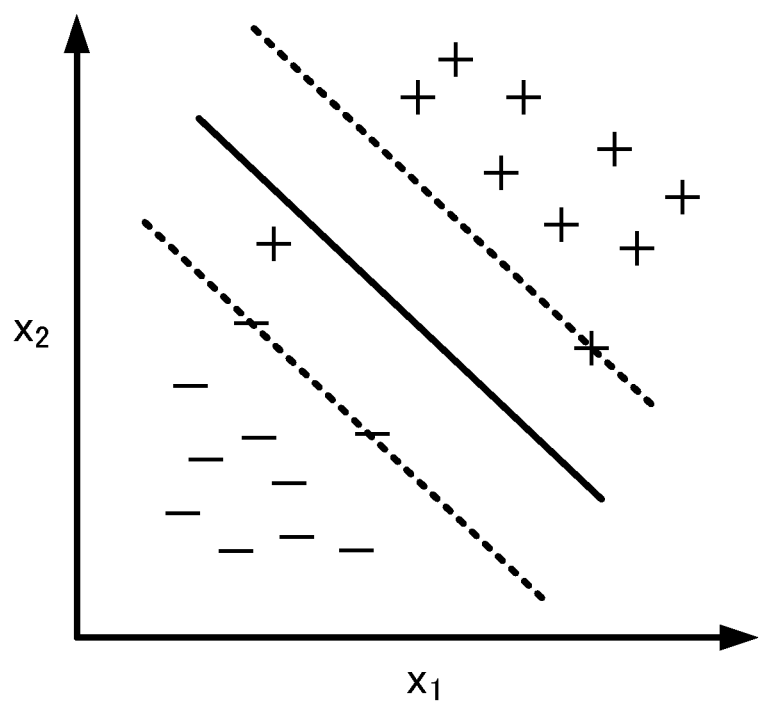
FIG. 9B is a view illustrating an example of the case in which the adjustment parameter C is small.

When generating the discriminant function by solving the minimization problem, it is necessary to consider to what degree a learning error is allowed in the linear SVM. It is referred to as a hard margin to generate a discriminant function without allowing a learning error. Meanwhile, it is referred to as a soft margin to generate a discriminant function while allowing a learning error. In the linear SVM, an adjustment parameter C is used as a parameter for determining the degree to which the learning error is allowed. The larger the C, the more it becomes a hard margin (refer to FIG. 9A), while the smaller the C, the more it becomes a soft margin (refer to FIG. 9B).

Since the correct answer percentage when the testing images are categorized varies depending on the value of the adjustment parameter C, an optimum value for the adjustment parameter C should be sought. This point will be described hereinafter. The classification condition learning unit 125 generates a discriminant function by solving the minimization problem for an arbitrary adjustment parameter C (refer to FIGS. 9A and 9B). In the foregoing, a general principle of the linear SVM has been described with reference to FIGS. 8, 9A, and 9B and the formulas (2) through (8).

However, in the present embodiment, n points determined from the similarity feature vector for each of the n learning images (the point of the label 1 is + and the point of the label −1 is −) are distributed in the n-dimensional vector space. Further, the exponentiation unit 124 differentiates the manner of this distribution by exponentiating each component of the similarity feature vector. The classification condition learning unit 125 generates a discriminant function that allows for linear separation of the n points into the two categories by solving the minimization problem for an arbitrary value of the adjustment parameter C. The classification condition learning unit 125 generates a plurality of different discriminant functions corresponding to a plurality of different combinations of the exponentiation parameter α and the adjustment parameter C. The combinations of α and C are determined by the grid research described hereinafter. The classification condition learning unit 125 corresponds to the condition learning device.

Returning to FIG. 1, the classification unit 126 classifies the unlabeled testing images into either one of the two categories in accordance with the discriminant function which is the classification condition generated by the classification condition learning unit 125. Specifically, the classification unit 126 seeks the value for y by substituting the value of the similarity feature vector of the testing image (for example, in the case of the similarity feature vector of the testing image $T_1$ illustrated in FIG. 5, the value that is sought from each component 0.5, 0.5, 0.9, . . . 0.9) for x of the equation (3) which represents the generated discriminant function. The classification unit 126 classifies the testing images into the category $C_1$ when the value for y is larger than or equal to 1 and into the category $C_2$ when the value for y is smaller than or equal to −1.

Further, the classification unit 126 executes true or false determination as to whether the classified testing images are classified into the correct category. Specifically, the classification unit executes true or false determination by referring to a table for true or false determination illustrated in FIG. 10. For example, referring to the table for true or false determination, the classification unit 126 determines that the answer is correct when the classified testing image $T_1$ is in the category $C_1$ (y≥1) and that the answer is incorrect when the classified testing image $T_1$ is in the category $C_2$ (y≤−1). The classification unit 126 calculates the correct answer percentage (referred to sometimes as discrimination rate) % from the correct answers or incorrect answers for all the m testing images $T_1$-$T_m$. The classification unit 126 calculates the correct answer percentage about the discriminant functions for all the plurality of different combinations of C and α. The classification unit 126 corresponds to the classifier.

Then, the selection unit 127 selects a combination of the adjustment parameter C and the exponentiation parameter α for which the correct answer percentage becomes maximum when the classification unit 126 classifies the testing image into either one of the categories. In this manner, it is possible to determine the discriminant function at the adjustment parameter C for which the correct answer percentage becomes maximum, and the exponentiation parameter α that uniquely determines the distribution of the n points in the vector space for that time. The classification unit 127 corresponds to the selector.

In the foregoing, the function of each unit of the machine learning device 100 has been described. Classification processing by cooperation of the respective units of the machine learning device 100 will be described below with reference to the flow chart illustrated in FIG. 11.

This classification processing is started by the user giving a learning instruction to the machine learning device 100 (for example, depressing the learning start button via the mouse or keyboard, or the like), with this as a trigger, after the plurality of learning images and the plurality of testing images are stored in the image storage unit 111 and thus the preparation for learning is ready.

First, the image acquisition unit 121 acquires the learning images and the testing images (step S11). Specifically, the image acquisition unit 121 acquires the n learning images (n≥2) and m testing images (m≥2) from the image storage unit 111.

Then, the feature vector acquisition unit 122 acquires the feature vectors for the learning images and the testing images (step S12). Specifically, the feature vector acquisition unit 122 acquires a feature vector in which local features are quantified from each of the n learning images by the BoF and a feature vector in which local features are quantified from each of the m testing images by the BoF.

Then, the feature vector acquisition unit 122 normalizes the feature vectors for the both images (step S13). Specifically, the feature vector acquisition unit 122 normalizes the n feature vectors and m feature vectors by the L1 norm.

Then, the vector conversion unit 123 converts the feature vectors for the both images into similarity feature vectors, respectively (step S14). Specifically, the vector conversion unit 123 converts the feature vector for each of the n learning images to the similarity feature vector based on the similarity degree between the respective learning images (refer to FIG. 4). Further, the vector conversion unit 123 converts the feature vector for each of the m testing images to the similarity feature vector based on the similarity degree between the learning image and the testing image (refer to FIG. 5).

Then, the control unit 120 determines the search range ($C_1$ to $C_k$, $α_1$ to $α_k$) of the adjustment parameter C and the exponentiation parameter α for the grid search (step S15). The control unit 120 can arbitrarily determine the search range, and with $C_1$ to $C_k$ being 0.01 to 10 and the step interval being 10, for example, four adjustment parameters occur such as $C_1$=0.01, $C_2$=0.1, $C_3$=1, and $C_4$=10. Likewise, with $α_1$ to $α_k$ being 0.1 to 10 and the step interval being 10, three exponentiation parameters occur such as $α_1$=0.1, $α_2$=1, and $α_3$=10.

Thus, it follows that the pattern number in the combination of C and α is k×k (in the case of the above example, 4×3=12). It is referred to as the grid search to perform a search with respect to all the k×k patterns.

Then, the control unit 120 determines an arbitrary combination ($C_i$, $α_j$), where i refers to an arbitrary value of the values 1 to k (step S16).

Then, the exponentiation unit 124 exponentiates each component of the similarity vector with the determined $α_i$ (i=1 to k) (step S17). For example, the exponentiation unit 124 raises to the 0.1th power the value of each component of the similarity feature vector for each of the n learning images $S_1$ to $S_n$ when $α_i$=0.1 (i=1). Thus, the n points in the vector space, which are determined from the similarity feature vector before the exponentiation, are moved to positions determined from the similarity feature vector after the exponentiation.

Further, the exponentiation unit 124 exponetiates each component of the similarity feature vector with the determined $\alpha_i$ (i=1 to k) to adjust the scale when testing with respect to the m testing images $T_1$ to $T_m$ as well.

Then, the classification condition learning unit 125 generates a discriminant function for the determined $C_i$ (step S18). For example, when $C_i$=0.01 (i=1), the similarity condition learning unit 125 generates, by solving the minimization problem with $C_i$=0.01, a discriminant function that performs linear separation of the n points in the vector space into two categories.

Then, the classification unit 126 classifies the testing images in accordance with the generated discriminant function (step S19). Specifically, the classification unit 126 classifies each of the testing images $T_1$-$T_m$ into either one of the two categories in accordance with the discriminant function. Further specifically, the classification unit 126 classifies the similarity feature vector for each of the m testing images into either one category or the other by substituting the value raised to the $\alpha_i$-th power for the discriminant function.

Then, the classification unit 126 calculates the correct answer percentage for the generated discriminant function (step S20). Specifically, the classification unit 126 executes true or false determination with respect to each of the m testing images $T_1$ to $T_m$ by referring to the table for true or false determination illustrated in FIG. 10. For example, when m=100 and 70 of them are correct answers, it follows that the correct answer percentage is 70%.

Then, the control unit 120 determines whether the search with respect to all the combinations is ended (step S21). Specifically, the control unit 120 determines whether the k×k searches are ended which are all the combinations in the search range ($C_1$ to $C_k$, $\alpha_1$ to $\alpha_k$) determined at step S15.

When the searches for all the combinations are not ended (step S21; No), the procedure is returned to step S16, so that other arbitrary combinations are determined, and the processings at steps S17 through S20 are performed. In this manner, the processings at steps S16 through S21 are performed in a loop until the correct answer percentage for the discriminant function in each of all the k×k patterns.

When the searches for all the combinations are ended (step S21; Yes), the selection unit 127 selects the combination of the adjustment parameter C and the exponentiation parameter $\alpha$ for which the correct answer percentage is maximum (step S22). Specifically, the selection unit 127 selects a combination of the adjustment parameter C of the discriminant function and the exponentiation parameter $\alpha$ to exponentiate each component of the similarity feature vector for which the correct answer percentage calculated at the testing stages of steps S19 and S20 is maximum. In this manner, the discriminant function for which the correct answer percentage can be obtained.

Figure 12:
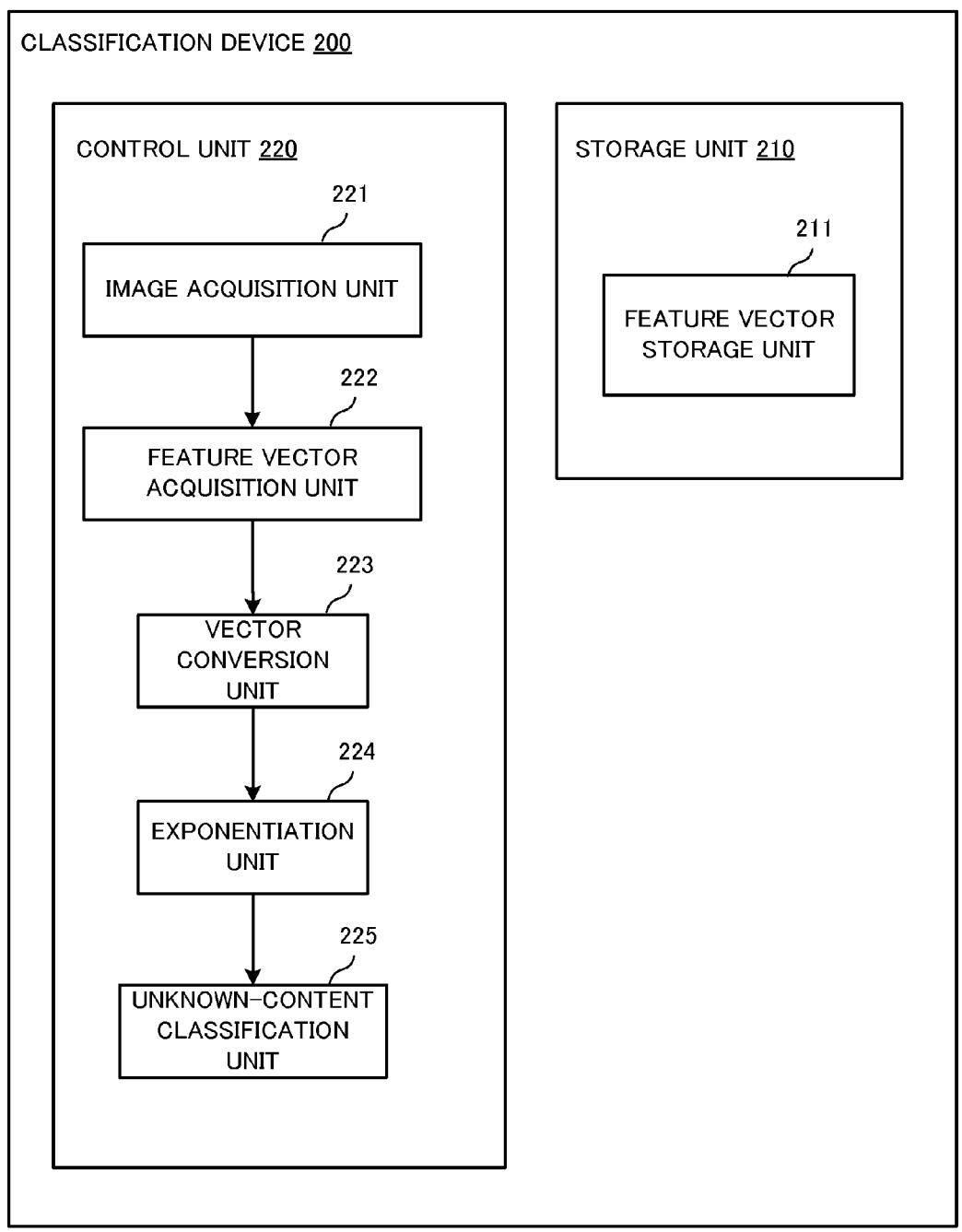
FIG. 12 is a block diagram illustrating the configuration of a classification device.

After having passed through such learning stage and testing stage, the classification device 200 illustrated in FIG. 12, in a commercial environment, categorizes an unknown image in accordance with the discriminant function which is the classification condition learned by the machine learning device 100. The unknown image is an image which, unlike the learning image and the testing image, is unlabeled and for which true or false determination cannot be performed.

The feature vector storage unit 211 of the storage unit 210 stores the feature vector $S_1$-$S_n$ generated from the learning image in relation to generating the similarity feature vector based on the similarity degree between the unknown image and the learning image. Description will now be made of the flow in which the classification unit 200 classifies the unknown image. The classification device 200 achieves the functions of the respective units described below, by executing the program for classification processing in the commercial environment which is stored in the ROM of the control unit 220. First, the image acquisition unit 221 acquires the unknown image. Then, the feature vector acquisition unit 222 acquires the feature vector from the unknown image in the same manner as the feature vector acquisition unit 122 of the machine learning device 100.

Then, the vector conversion unit 223 converts the feature vector for the unknown image to a similarity feature vector based on the similarity degree between the learning image and the unknown image. Since the unknown image is a single piece, the similarity matrix with the feature vectors $S_1$-$S_n$ for the learning image becomes a one-row and n-column matrix in which the row vector at the first row becomes a similarity feature vector to be substituted for the feature vector for the unknown image.

Then, the exponentiation unit 224 exponentiates each component of the similarity feature vector for the unknown image with the optimum exponentiation parameter $\alpha$ selected by the selection unit 127 of the machine learning device 100. Then, the unknown content classification unit 225 classifies the unknown image into either one of the two categories by classifying one point in the vector space, which is determined from the exponentiated similarity feature vector, in accordance with the discriminant function having the optimum adjustment parameter C. In this manner, the classification device 200 accurately classifies the unknown image in accordance with the discriminant function using the exponentiation parameter $\alpha$ and the adjustment parameter C for which the correct answer percentage in the learning by the machine learning device 100 is maximum.

In the machine learning device 100 of the embodiment described above with reference to FIG. 11, due to the inclusion of the vector conversion unit 123, an n-row, n-column similarity matrix is generated from the feature vector for each of the n learning images, and each of the row vectors for the respective rows of the generated similarity matrix is made to be the similarity feature vector to be substituted for the feature vector. In this manner, the feature vector, which is uniquely determined from the nature of the learning image, can be converted to the similarity feature vector based on the similarity degree between the learning images. Thus, the manner of distribution in the vector space can be varied irrespective of the nature of the learning image so that the degree of freedom for linear separation can be enhanced.

Each component of the similarity feature vector is a similarity degree calculated from the histogram intersection. Therefore, the conversion from the feature vector to the similarity feature vector is a linear conversion based on the similarity degree. Thus, it is possible to achieve a performance close to non-linear SVM while learning at a high speed with the linear SVM, as compared with the case in which non-linear separation into two categories is achieved by the non-linear SVM in which the processing load is high and the learning time is long.

Further, when the number of dimensions (in the present embodiment, n dimensions), which is the number of the components of the similarity feature vector, is larger than the number of dimensions (in the present embodiment, four (4) dimensions), which is the number of the components of the feature vector, it follows that the vector conversion unit 123 converts the feature vector to the similarity feature vector with dimensions more than the number of dimensions of the feature vector. In other words, the vector conversion unit 123 performs dimension extension from the four (4)-dimensional vector space to an n-dimensional (n>4) vector space. Generally, when the dimension is extended, the linear separation becomes easier so that the correct answer percentage of the generated discriminant function is enhanced. Thus, the classification device 200 can accurately classify the unknown image in accordance with the discriminant function representing a high correct answer percentage.

Further, in the machine learning device 100 of the present embodiment, the value of the similarity degree for each component of the similarity feature vector is exponentiated due to the inclusion of the exponentiation unit 124. By preparing a plurality of values for the exponentiation parameter α, an equal plurality of variations of the distribution can be obtained. In the classification processing, the optimum value α for which the correct answer percentage is the highest is selected by the grid search. Thus, a discriminant function with a high correct answer percentage can be generated while increasing the degree of freedom when classifying into two categories in the vector space. Consequently, when the classification device 200 classifies an unknown image, the classification into the category to which the unknown image can be performed accurately.

Figure 11:
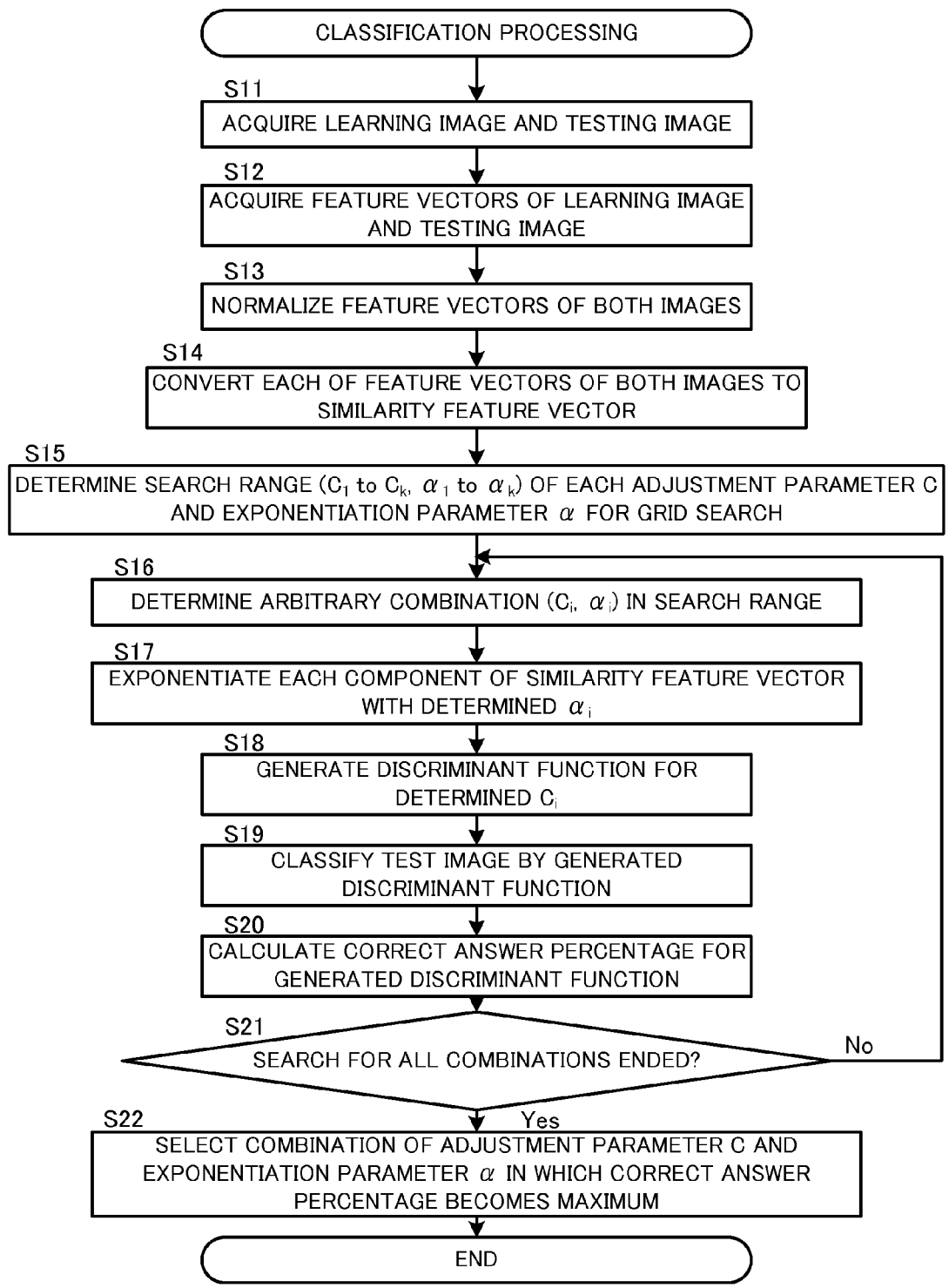
FIG. 11 is a flow chart illustrating the flow of classification processing according to an embodiment of the invention.

Although the description of the embodiment is ended now, it is of course that the specific configuration of the machine learning device 100 and the contents of the classification processing illustrated in FIG. 11 are not limited to what has been described above.

Modification

Figure 13:
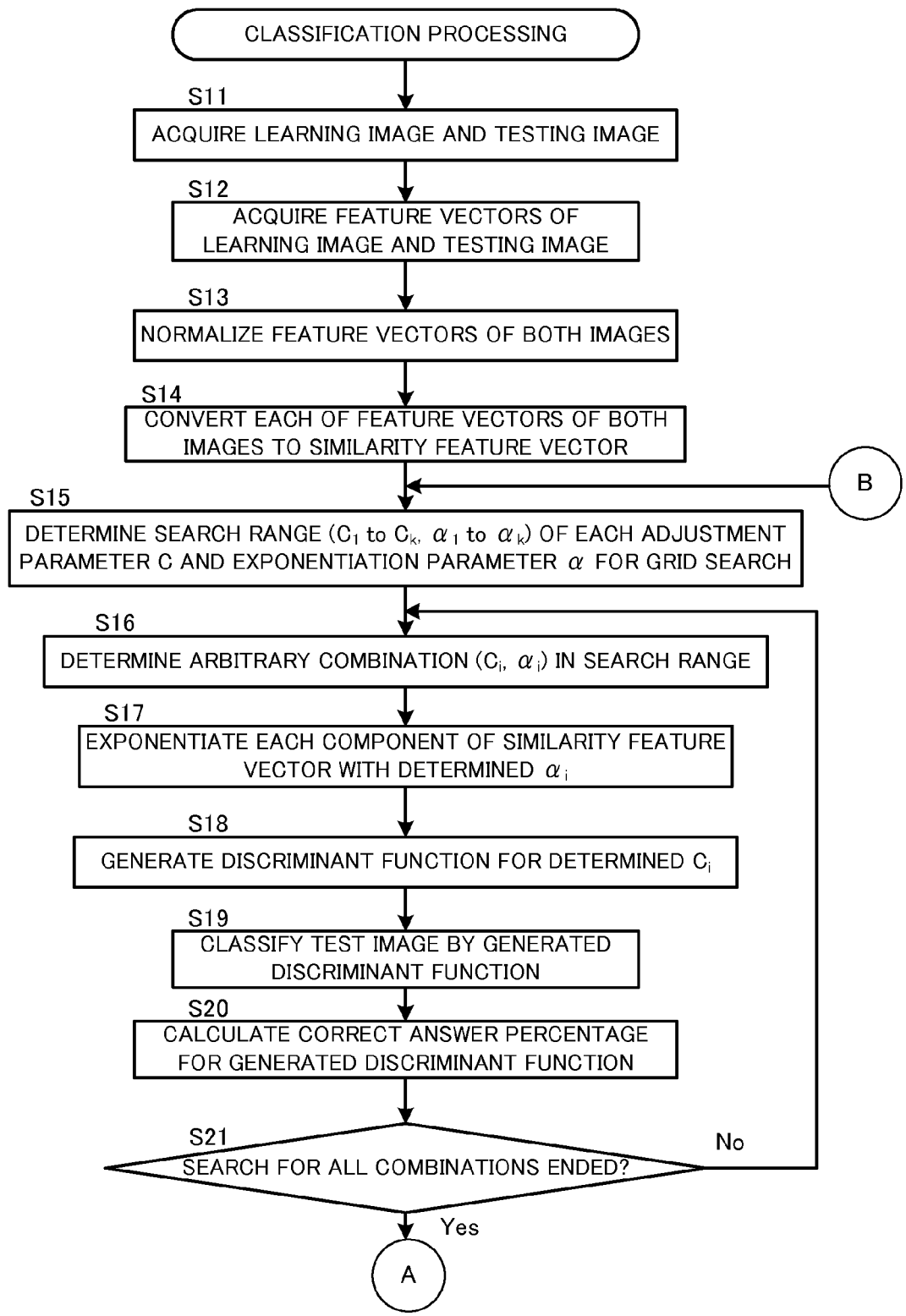
FIG. 13 is a flow chart illustrating the flow of classification processing according to a modification to the embodiment.
Figure 14:
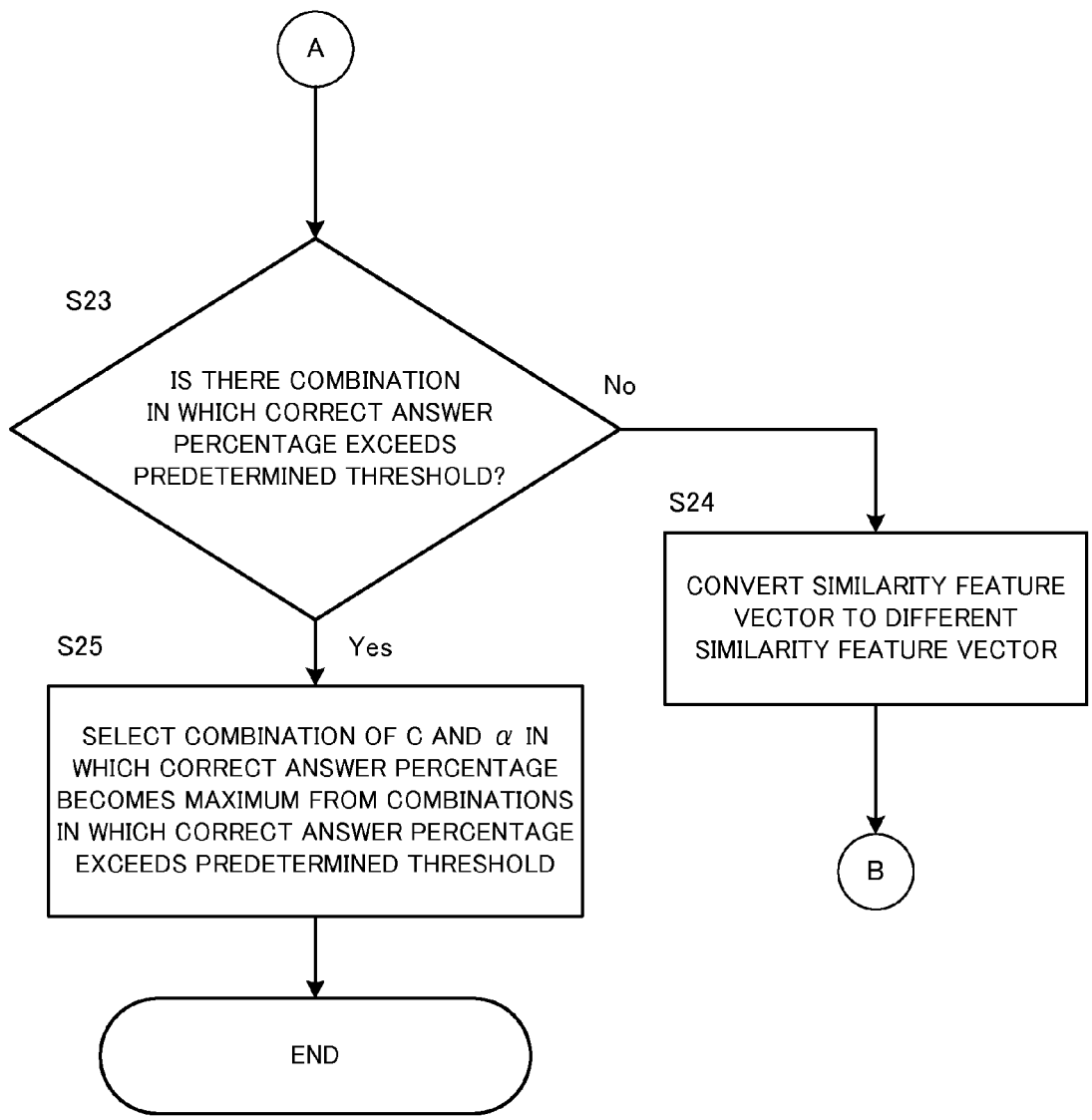
FIG. 14 is a flow chart illustrating a continuation of the classification processing in FIG. 13.

For example, the classification processing in the above embodiment illustrated in FIG. 11 may be modified as illustrated in FIGS. 13 and 14. The classification processing according to this modification is differentiated in that new steps S23 through S25 are added instead of step S22 of the classification processing in FIG. 11. A description will now be made focusing on the points of differentiation.

When the search for all the combinations is ended (step S21), the control unit 120 determines whether there is a combination in which the correct answer percentage exceeds a predetermined threshold (step S23). When there is no combination in which the correct answer percentage exceeds the predetermined threshold (step S23; No), the vector conversion unit 123 converts the similarity feature vector to a different similarity feature vector (step S24).

Specifically, the vector conversion unit 123 converts the similarity feature vector to the different similarity feature vector based on the similarity degree between the feature vectors for each of the n learning images illustrated in FIG. 4. In this manner, a new n-row, n-column matrix is generated, and the row vector for each row of the generated new matrix is made to be the different similarity feature vector to be substituted for the similarity feature vector.

The vector conversion unit 123 converts, in a similar manner, the similarity feature vector for each of the m testing images illustrated in FIG. 5 to a different similarity feature vector.

Returning to step S15, the grid search at steps S15 through S21 is performed with the different similarity feature vector. In this manner, until a combination in which the correct answer percentage exceeds the predetermined threshold is obtained, the grid search is performed by generating a similarity feature vector, which is different from the current similarity feature vector, based on the similarity degree between the current similarity vectors each time.

When the control unit 120 determines that there is a combination in which the correct answer percentage exceeds the predetermined threshold (step S23; Yes), the selection unit 127 selects the combination of C and α in which the correct answer percentage is maximum out of the combinations in which the correct answer percentage exceeds the predetermined threshold (step S25). When there is one combination in which the correct answer percentage exceeds the predetermined threshold, the selection unit 127 may select the one combination of C and α, and when there are two or more such combinations, it may select the combination of C and α in which the correct answer percentage is highest.

In accordance with the classification processing according to the above modification, until the correct answer percentage exceeds the predetermined threshold (e.g., 80%), a similarity feature vector which is different from the current similarity feature vector is generated based on the similarity degree between the current similarity feature vectors. In other words, until the correct answer percentage exceeds the predetermined threshold, a new similarity feature vector may be generated infinite times. Thus, with the machine learning device 100, a discriminant function is obtained for which the correct answer percentage exceeds the predetermined threshold. Accordingly, the classification device 200 can accurately classify the unknown image.

In the above-described embodiment and modification, the classification condition learning unit 125 is configured to solve a minimization problem with a constraint condition by the linear SVM. While, in this instance, it is configured to generate a discriminant function that maximizes the margin to perform a linear separation of the n learning images into two categories, there is no limitation thereto. For example, the classification condition learning unit 125 may generate a discriminant function that classifies the n learning images into two categories using a technique other than the linear SVM. The classification condition learning unit 125 may generate a discriminant function using, as the other technique, the k-nearest neighbor method, Naïve Bayes classification method, decision tree, neural network, bagging method, boosting method, random forest method, or the like, for example.

Further, although, in the above-described embodiment and modification, the description has been made on the assumption that the step intervals in the grid search are the same, there is no limitation thereto. For example, it may be configured such that a grid search is coarsely performed with a large step interval so as to specify a combination of C and α which represent a high correct answer percentage, and subsequently a grid search is locally and finely performed with a small step interval in a range near to the C and α which represent a high correct answer percentage. In this manner, a fine-tuning of the C and α can be achieved so that a high correct answer percentage can be expected.

Further, in the above-described embodiment and modification, it is configured such that the exponentiation unit 124 exponentiates the value of the similarity degree for each component of the similarity feature vector, but such exponentiation is not essential. For example, a discriminant function may be generated for the converted similarity feature vector without performing the exponentiation processing by the exponentiation unit 124. In this instance, in the classification processing illustrated in FIGS. 11, 13, and 14, it may be configured such that no exponentiation processing is performed and the adjustment parameter C alone is used as the object for the grid search. In this manner, the processing load of the machine learning device 100 can be reduced.

Further, although, in the above-described embodiment and modification, the description has been made on the assumption that the number (m) of the testing images is equal to the number (n) of the learning images, there is no limitation thereto. The number m may be different from the number n, and it is not necessarily essential that m be a natural number larger than or equal to 2; thus, testing may be performed with m=1 as the minimum unit.

Further, in the above-described embodiment and modification, the description has been made on the assumption of the machine learning device 100 that learns the classification condition under which the plurality of images are classified into two categories, but there is not limitation thereto. The machine learning device 100 may learn a classification condition for classifying into multiple categories such as three or more categories.

Further, although, in the above-described embodiment and modification, the description has been made with image taken as an example of content, there is no limitation thereto. Machine learning by the machine learning device 100 may also be applied to text, sound, or the like from which a feature vector can be acquired.

Further, each function of the machine learning device 100 and classification device 200 according to the present disclosure can also be performed by such a computer as ordinary PC.

Specifically, in the above-described embodiment, the description has been made on the assumption that the classification processing program is stored beforehand in the ROM of the control unit 120 (220). However, the computer may be configured such that the program for causing the function of each unit of FIGS. 1 and 12 to be achieved is stored and distributed in a computer-readable recording medium such as a flexible disc, CD-ROM (Compact Disc Read Only Memory), DVD (Digital Versatile Disc), and MO (Magneto-Optical Disc) so that the function of each unit can be achieved by installing the program into the computer.

Further, it may be configured such that the program is stored in a disc device possessed by a server device on a communication network such as internet and the computer performs downloading or the like.

In the foregoing, the embodiment of the present invention has been described, but this embodiment is merely by way of example, and does not limit the technical scope of the present invention. The present invention can be embodied in other various manners, and various changes or modifications such as omissions, substitutions or the like will become possible without departing from the spirit and scope of the present invention. Such embodiments and modifications thereto are encompassed in the scope of the invention as defined by the appended claims.

What is claimed is:

1. A machine learning device comprising:
a processor and a memory storing a program which is executable by the processor to perform operations comprising:
acquiring n learning contents (n is a natural number larger than or equal to 2) with a label to be used for categorization;
acquiring a feature vector from each of the n learning contents;
converting the feature vectors for the n learning contents to similarity feature vectors based on similarity degrees between the learning contents;
learning a classification condition for categorizing the n learning contents based on the similarity feature vectors and the label assigned to each of the n learning contents; and
categorizing a testing content to which the label is not assigned, in accordance with the learned classification condition;
wherein the labels are for categorizing the n learning contents into a plurality of categories;
wherein the processor learns a function for linear separation as the classification condition in order to classify n points in a vector space determined by the similarity feature vectors of the n learning contents into the plurality of categories, based on the labels assigned to the n learning contents; and
wherein the processor classifies the testing content into one of the plurality of categories in accordance with the function.

2. The machine learning device according to claim 1, wherein converting the feature vectors comprises generating an n-row and n-column similarity matrix in which a number of the rows is n equal to the number n, a number of the columns is n equal to the number n, and each component of the similarity matrix is one of the similarity degrees between the learning contents, and converting elements of each row of the similarity matrix to elements of one of the similarity feature vectors.

3. The machine learning device according to claim 1, the operations further comprising:
exponentiating a value of the similarity degree for each component of the similarity feature vector; and
selecting a combination out of combinations of adjustment parameters and exponentiation parameters, the combination achieving a maximum correct answer percentage of the classification of testing contents by the processor, the adjustment parameter defining a degree to which a learning error is allowed, the exponentiation parameter being for changing the similarity degrees by exponentiation.

4. The machine learning device according to claim 1, wherein the processor learns the function for performing linear separation into the plurality of categories by linear Support Vector Machine (linear SVM), k-nearest neighbor method, Naive Bayes classification method, decision tree, neural network, bagging method, boosting method, or random forest method.

5. The machine learning device according to claim 1, wherein the processor converts the feature vectors to similarity feature vectors with dimensions larger than dimensions of the feature vectors.

6. The machine learning device according to claim 1, wherein the processor seeks the similarity degrees between the learning contents from histogram intersection.

7. The machine learning device according to claim 1, wherein the processor acquires the feature vector in which a local feature is quantified from each of the n learning contents by BoF (Bag of Features) and normalizes, by L1 norm or L2 norm, the feature vector acquired from each of the n learning contents.

8. The machine learning device according to claim 1, wherein each of the learning contents and the testing content comprises an image, a sound, or a text.

9. A classification device comprising:
a processor and a memory storing a program which is executable by the processor to perform operations comprising:

categorizing an unknown content different from the learning contents and the testing content in accordance with the classification condition learned by the machine learning device according to claim 1.

10. The classification device according to claim 9, the operations performed by the processor of the classification device further comprising:

acquiring from the unknown content a feature vector representing a feature of the unknown content; and converting the feature vector of the unknown content to a similarity feature vector based on a similarity degree between the learning contents and the unknown content, wherein the processor of the classification device categorizes the unknown content by classifying, in accordance with the classification condition, a point in a vector space determined from the similarity feature vector of the unknown content.

11. A machine learning method comprising:

acquiring n learning contents (n is a natural number larger than or equal to 2) with a label to be used for categorization;

acquiring a feature vector representing a feature from each of the n learning contents;

converting the feature vectors for the n learning contents to similarity feature vectors based on similarity degrees between the learning contents;

learning a classification condition for categorizing the n learning contents based on the similarity feature vectors and the label assigned to each of the n learning contents; and categorizing a testing content to which the label is not assigned, in accordance with the learned classification condition;

wherein the labels are for categorizing the n learning contents into a plurality of categories;

wherein the learning comprises learning a function for linear separation as the classification condition in order to classify n points in a vector space determined by the similarity feature vectors of the n learning contents into a plurality of categories, based on the labels assigned to the n learning contents; and wherein the testing content is classified into one of the plurality of categories in accordance with the function.

12. A classification method comprising:

categorizing an unknown content different from the learning contents and the testing content in accordance with the classification condition learned by the machine learning method according to claim 11.

13. A non-transitory computer readable recording medium storing a program that is executable by a computer of a machine learning device to perform functions comprising:

acquiring n learning contents (n is a natural number larger than or equal to 2) with a label to be used for categorization;

acquiring a feature vector from each of the n learning contents;

converting the feature vectors for each of the n learning contents to similarity feature vectors based on similarity degrees between the learning contents;

learning a classification condition for categorizing the n learning contents based on the similarity feature vectors and the label assigned to each of the n learning contents; and categorizing a testing content to which the label is not assigned, in accordance with the learned classification condition;

wherein the labels are for categorizing the n learning contents into a plurality of categories;

wherein the learning comprises learning a function for linear separation as the classification condition in order to classify n points in a vector space determined by the similarity feature vectors of the n learning contents into a plurality of categories, based on the labels assigned to the n learning contents; and wherein the testing content is classified into one of the plurality of categories in accordance with the function.

14. A non-transitory computer readable recording medium storing a program that is executable by a computer of a classification device to perform functions comprising:

categorizing an unknown content different from the learning contents and the testing content in accordance with the classification condition learned through execution of the program stored on the non-transitory computer readable recording medium according to in claim 13.

* * * * *

UNITED STATES PATENT AND TRADEMARK OFFICE
CERTIFICATE OF CORRECTION

PATENT NO.        : 9,659,239 B2                                     Page 1 of 1
APPLICATION NO.   : 14/850516
DATED             : May 23, 2017
INVENTOR(S)       : Kazuhisa Matsunaga It is certified that error appears in the above-identified patent and that said Letters Patent is hereby corrected as shown below:

In the Claims

Column 18, Line 41, after "to" delete "in".

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*